United States Patent [19]

Cichowski

[11] 3,758,609

[45] Sept. 11, 1973

[54] PROCESSES FOR THE OXIDATIVE DEHYDROGENATION OF HYDROCARBON FEEDSTOCKS

[75] Inventor: Robert S. Cichowski, Arroyo Grande, Calif.

[73] Assignee: Phillips Petroleum Company, Bartlesville, Okla.

[22] Filed: Jan. 11, 1971

[21] Appl. No.: 105,730

[52] U.S. Cl............ 260/680 E, 252/472, 260/683.3
[51] Int. Cl............................ C07c 5/18, C07c 11/18
[58] Field of Search...................... 260/680 E, 683.3

[56] References Cited
UNITED STATES PATENTS

| 3,336,408 | 8/1967 | Capp et al. | 260/669 |
| 3,409,697 | 11/1968 | Callahan et al. | 260/680 |
| 3,414,631 | 12/1968 | Grasselli et al. | 260/680 |

Primary Examiner—Paul M. Coughlan, Jr.
Attorney—Young & Quigg

[57] ABSTRACT

Organic compounds are dehydrogenated to compounds having a higher degree of unsaturation by contacting the feedstock in the vapor phase in the presence of an oxygen-containing gas with a catalyst containing cobalt, iron and antimony in an oxidized state or nickel-iron-antimony in an oxidized state. Representative of such conversions is the oxidative dehydrogenation of isopentane to isoprene over a nickel-iron-antimony-oxygen catalyst having a nickel:iron:antimony atomic ratio of 1:3:1. The conversion products are valuable compounds particularly useful as intermediates for the preparation of polymeric materials such as synthetic rubbers and the like.

4 Claims, No Drawings

PROCESSES FOR THE OXIDATIVE DEHYDROGENATION OF HYDROCARBON FEEDSTOCKS

The present invention relates to chemical compositions. More particularly, the invention relates to catalyst compositions, their preparation and the catalytic processes employing such compositions, e.g., processes for effecting the dehydrogenation of hydrocarbons.

Thermal noncatalytic and catalytic processes for converting organic compounds to compounds having a higher degree of unsaturation are known. The former are characterized by undesirable side reactions, low order of conversion and yields and poor selectivity to desired product. The catalytic processes are characterized by the particular catalytic material employed and the conditions under which the processes are operated, e.g., in the absence or presence of oxygen. While a number of such catalytic processes have attained some measure of commercial success, there is a continuing search for better catalytic materials which exhibit the high activity, high yield to desired product, high selectivity to desired product, extended longevity, high response to regeneration, especially in the presence of air, and which keep undesirable side reactions to a minimum; all characteristics of good dehydrogenation catalysts. The vexatious problem constantly faced by those skilled in the art is the identification and characterization of the compositions which are highly efficient dehydrogenation catalysts.

Among the more recently disclosed dehydrogenation catalysts are those which include halogens or halogen-releasing materials. Such catalysts have exhibited so many disadvantages in regard to equipment corrosion and the additional expense of continuously feeding, recovering and recycling the relatively expensive halogen materials that economically practical, large scale use of such catalytic materials have been precluded. Halogen-free catalytic materials continue to be the most desirable for use in dehydrogenation processes.

The present invention provides a novel catalyst and a novel process for the conversion of hydrocarbon feedstocks to hydrocarbons having a greater degree of unsaturation and which have the same or lower number of carbon atoms as the hydrocarbon feed. According to this invention, hydrocarbon feedstocks can be converted directly to hydrocarbons having a greater degree of unsaturation by contacting said feedstock under dehydrogenation conditions in the vapor phase in the presence of molecular oxygen with a catalytic material comprising a combination of nickel, iron and antimony, in association with oxygen, or cobalt, iron and antimony, in association with oxygen. Thus, paraffinic hydrocarbons can be converted in good yields to diolefins and/or monoolefins and monoolefins can be converted to diolefins. The invention is particularly applicable for the production of diolefins from paraffins and particularly useful results are obtained by the dehydrogenation of isopentane to isoprene.

The hydrocarbon feedstocks which are applicable for the oxidative dehydrogenation processes of the present invention comprise dehydrogenatable aliphatic hydrocarbons having from about three to about 12 carbon atoms per molecule and at least one

grouping. These can be branched or unbranched and include paraffins as well as monoolefins, but the application of the process for paraffins is presently considered most advantageous. The conversion of isopentane to isoprene has been found particularly effective. Some specific examples of other feeds include propane, butane, isobutane, pentane, hexane, 2-methylhexane, octane, 2,4-dimethyloctane, butene-2, 2-methylbutene-1, hexene-2, octene-1, 3-methylnonene-4, dodecene-1, and the like including mixtures thereof.

The catalysts of the present invention comprise nickel or cobalt associated with iron and also associated with antimony. These elements are not necessarily in the elemental state but can be combined with sufficient oxygen to form one or more neutral compounds such as nickel phosphate, ferric oxide, antimony phosphate, nickel oxide, etc., depending upon the proportions of the elements present. It is presently preferred to use either cobalt or nickle in the catalysts of the invention. Mixtures of cobalt and nickel have been found less satisfactory. In general, the proportions of cobalt or nickel, iron and antimony will correspond to the expression (Co or Ni)$_x$Fe$_y$Sb$_z$, wherein x, y and z will have values as follows:

|   | Broad  | Preferred |
|---|--------|-----------|
| x | 0.1–10 | 1–3.5     |
| y | 0.1–10 | 0.5–3     |
| z | 0.1–5  | 0.5–1     |

These catalysts can also be supported on or diluted with conventional catalytic materials such as silica, alumina, boria, magnesia, titania, zirconia, and combinations thereof, as well as with other similar conventional materials known in the art.

The catalysts of the present invention can be prepared by any suitable method. Conventional methods such as coprecipitation, impregnation, or dry-mixing can be used. In general, any method can be used which will provide a composition containing the above-described elements in the above-described proportions and which will have a catalytic surface area of at least 1 m$^2$/g. Thus, a cobalt or nickel compound, an iron compound, and an antimony compound can be combined in any suitable way. Substantially, any nickel, cobalt, iron or antimony compounds can be employed in the preparation so long as none of the compounds are detrimental to the final oxidative dehydrogenation catalyst, and so long as all of the other elements in the compounds used are removed from the final catalyst composition by prior washing or by volatilization. In some instances, however, small amounts of some of these other elements which are involved in the preparation of the catalyst can be tolerated in the final catalytic composition. For example, if alkali metal or alkaline earth metal hydroxides are used in a procedure involving precipitation, small residual amounts of such metals are not damaging. Similarly, if a sulfate, such as nickel sulfate or iron sulfate, is employed in the preparation, small residual amounts of sulfur can also be tolerated. Generally, however, the preferred cobalt or nickel, iron, and antimony compounds are either the oxides of these elements or compounds convertible to the oxide on calcination. Some examples of these are cobalt nitrate, nickel acetate, iron nitrate, antimony oxide, and the like.

The preferred catalyst preparation method is to boil an aqueous solution containing soluble compounds of cobalt or nickel, iron, and antimony until sufficient water has been removed and the mixture becomes a viscous, hot, syrupy liquid which solidifies on cooling. This largely dehydrated mixture is then relatively rapidly brought to a high temperature in a furnace. For example, the mixture is heated to 1000°–1400° F. over a period not exceeding four hours, preferably not exceeding two hours. This relatively rapid heating to calcination temperature generally causes a foaming and an expansion of the mixture and then a solidification to a very porous and very uniform mass having a low apparent density. After reaching this calcination temperature, the mass is further heated in air at 1000°–1400° F. for 1–24 hours.

After this calcination, the catalyst is active for oxidative dehydrogenation and can be converted into any desired form or shape such as powder, granules, pellets, and the like.

In an alternative catalyst preparation method, solutions of suitable cobalt or nickel, and iron compounds are coprecipitated by the addition of alkali metal or alkaline earth metal hydroxides. The precipitate is then filtered, washed, dried, then impregnated with a solution of a suitable antimony compound. This composite is then activated by calcination in an oxygen-containing gas such as air at a temperature of 900°–1500° F. for 1–24 hours, or until the catalyst is active for oxidative dehydrogenation.

The hydrocarbon feedstocks can be dehydrogenated according to the process and with the catalyst of the present invention at temperatures in the range of from 800° to about 1300° F., preferably from about 950° to about 1200° F., at any convenient pressure such as from 7 to about 250 psia, and at a hydrocarbon:oxygen ratio of from about 1:1 to about 1:4. The presence of steam is frequently beneficial and steam:hydrocarbon ratios up to about 50:1 can be used. The hydrocarbon feed rate will generally be in the range of from about 50 to about 5000 GHSV. The fixed catalyst bed is the preferred mode of contact but other modes such as the fluidized bed, can also be used.

The dehydrogenation processes of this invention are ordinarily carried out by forming a mixture, preferably a preheated mixture, of the hydrocarbon feed, the oxygen-containing gas, and the steam (if used) and passing this mixture over the catalyst at the desired temperature. The effluent from the reaction zone is subjected to any suitable separation method to isolate and recover the desired product. Uncoverted feeds or partially converted materials can be recycled.

Generally, at least trace amounts of oxygenated products are also formed in these reactions. For example, compounds such as furan, acetaldehyde, furfural, and acetic acid can be obtained. Some carbon oxides will be formed, as well as some cracking products. In some instances, butadiene can be formed as a by-product of oxidative dehydrogenation of isopentane to isoprene.

The catalytic materials of the invention can operate for extended periods before regeneration is required. However, if and when such regeneration is required, this can be accomplished readily by simply stopping the flow of hydrocarbon feed. Contact of the catalytic material with air and steam can be maintained at process operating conditions until activity of the catalyst is restored.

The invention can be illustrated by the following examples.

EXAMPLE I

A Ni/Fe/Sb/O catalyst having a Ni:Fe:Sb atomic ratio of 1:3:1 was prepared by mixing 50 ml of a 1 molar nickel nitrate solution, 150 ml of a 1 molar ferric nitrate solution, and 90 ml of an antimony solution. The antimony solution had been prepared by adding 87.5 g $Sb_2O_3$ to 504 g citric acid; then adding 300 cc water with stirring and warming to bring back to room temperature; adding 450 ml of 70 percent $HNO_3$ with cooling then bringing the total volume to 1000 ml with water.

The resulting Ni–, Fe–, and Sb–containing solution was then boiled on a hot plate with stirring until sufficient dehydration took place to give the mixture a viscous, syrupy consistency. It was then further heated in a furnace programmed to reach 1200° F. in two hours after which it was maintained at 1200° F. for another four hours. During the calcination, the composition foamed, expanded then solidified into a low density, porous mass. This mass was then cooled and crushed to 20–28 mesh particles.

A portion of the above-prepared catalyst was charged into a tubular fixed bed reactor and tested for the dehydrogenation of isopentane. Isopentane at 1000 GHSV, diluted with air at 5000 GHSV and steam at 17125 GHSV, was passed over the catalyst at 1000° F. and at atmospheric pressure. After 12 hours on stream, the conversion was 18 percent. The modivity (a modified selectivity based on gas phase products only) to isoprene was 39 percent and the modivity to both isoprene and isoamylenes was 44 percent.

EXAMPLE II

A Co/Fe/Sb/O catalyst, having a Co:Fe:Sb atomic ratio of 1:3:1 was prepared. A 50 ml quantity of 1 molar cobalt nitrate solution and 50 ml of a 1 molar ferric nitrate solution, were slowly and simultaneously added to 200 ml water together with the simultaneous addition of sufficient 10 molar potassium hydroxide to maintain the mixture at a pH of 8 throughout the addition. The precipitate which resulted was filtered, washed and dried. The solid was crushed to −35 mesh and then impregnated with 75 ml of an antimony-containing solution. The antimony solution has been prepared by mixing 87.5 g of $Sb_2O_3$ and 378 g of citric acid and 300 ml water with stirring; then adding 300 ml of 70 percent $HNO_3$ with cooling, then bringing the total volume to 900 ml with water. The impregnated solid was dried under a heat lamp, then calcined four hours at 1100° F.

A 20–28 mesh portion of the above-prepared catalyst was then charged into a tubular fixed-bed reactor and tested for the oxidative dehydrogenation of isopentane. Isopentane at 1000 GHSV, diluted with air at 5000 GHSV and steam at 19,100 GHSV, was passed over the catalyst at 1100° F. and at atmospheric pressure. After 12 hours on stream, the conversion of isopentane was 25 percent. The modivity to isoprene was 32 percent and the modivity to both isoprene and isoamylenes was 42 percent.

EXAMPLE III

In a manner essentially similar to that of the preceding examples, still another Ni/Fe/Sb/O catalyst and still another Co/Fe/Sb/O catalyst were prepared and tested. These and atomic ratios different from those of Examples I and II. For purposes of comparison two similar but iron-free catalysts were also prepared. The catalysts were tested for the oxidative dehydrogenation of isopentane. The gaseous hourly space velocities of isopentane, air, and steam were 1000, 5000 and 10,000, respectively. The results are shown in the following Table.

TABLE

| Catalyst No. | 1 | 2 | 3 | 4 |
|---|---|---|---|---|
| Catalyst | Ni/Fe/Sb/O | Ni/Sb/O | Co/Fe/Sb/O | Co/Sb/O |
| Atomic Ratio (excluding O) | 3:1:1 | 3:1 | 3:1:1 | 3:1 |
| Conversion, % | 8.4 | 1.3 | 23.1 | 19.5 |
| Modivity to Isoprene, % | 0 | 0 | 1.4 | 0 |
| Modivity to Isoprene Plus Isoamylenes, % | 12.8 | 0 | 27.7 | 20.0 |

The data in the Table show that the Ni/Fe/Sb/O and Co/Fe/Sb/O catalysts are effective for the oxidative dehydrogenation of isopentane to isoamylenes and/or isoprene. Further, the data show that the corresponding iron-free catalysts gave much poorer results, indicating that the presence of the iron component in the catalysts is both necessary and advantageous.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

I claim:

1. A process for preparing olefins and diolefins by the dehydrogenation of paraffinic feedstocks containing from three to 12 carbon atoms and at least one

grouping which comprises contacting said feedstock in the vapor phase under dehydrogenation conditions in the presence of molecular oxygen with a catalyst consisting of nickel, iron and antimony in association with oxygen and having a nickel: iron: antimony atomic ratio of 3:1:1.

2. A process according to claim 1 wherein said feedstock comprises isopentane.

3. A process for preparing olefins and diolefins by the dehydrogenation of paraffinic feedstocks containing from three to 12 carbon atoms and at least one

grouping which comprises contacting said feedstock in the vapor phase under dehydrogenation conditions in the presence of molecular oxygen with a catalyst consisting of cobalt, iron and antimony in association with oxygen and having a cobalt: iron: antimony atomic ratio of 3:1:1.

4. A process according to claim 3 wherein said feedstock comprises isopentane.

* * * * *